Feb. 14, 1956 F. O. LUENBERGER 2,734,393
MOUNTING FOR TRANSMISSION AND DRIVE
Filed May 31, 1952 3 Sheets-Sheet 3

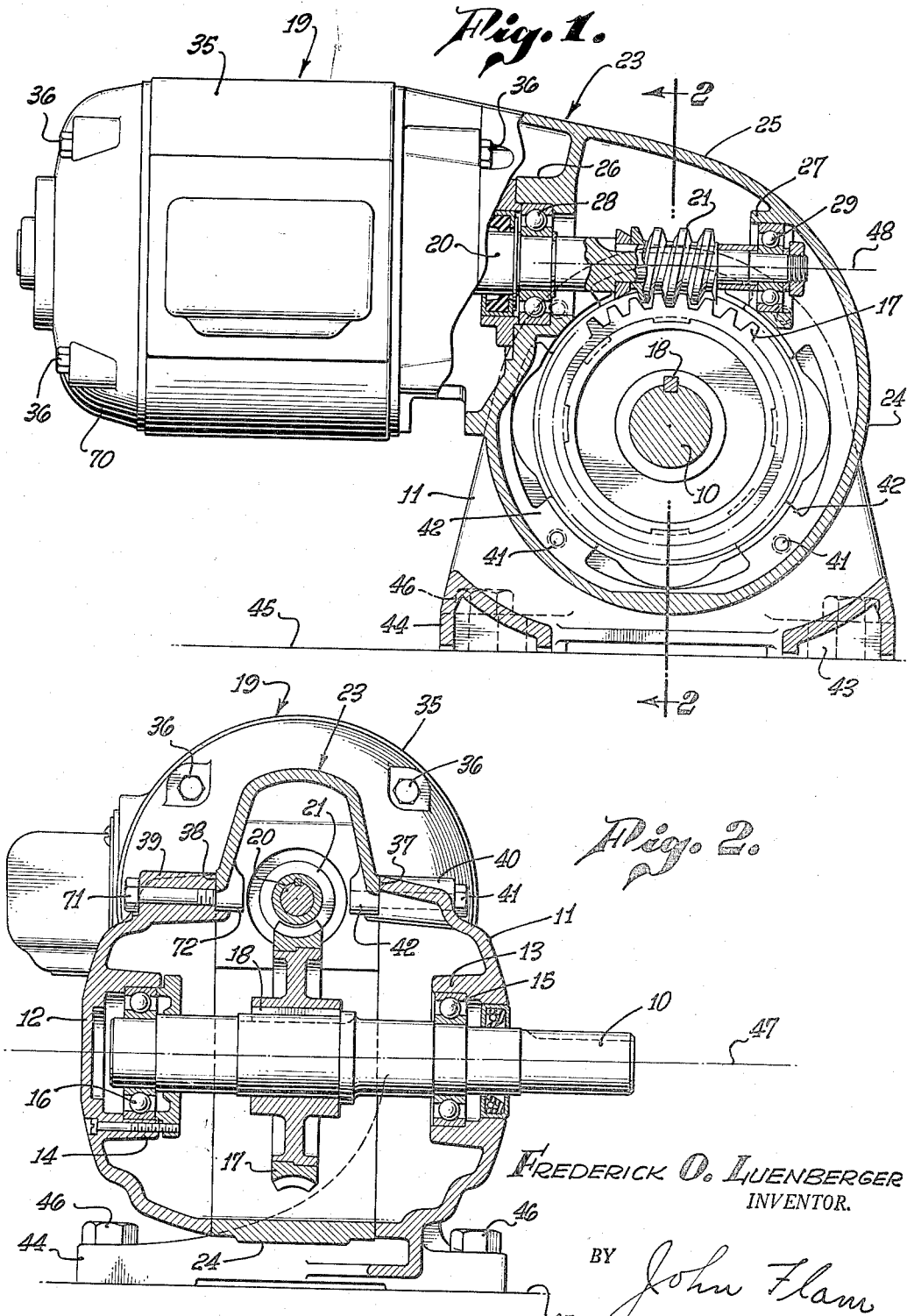

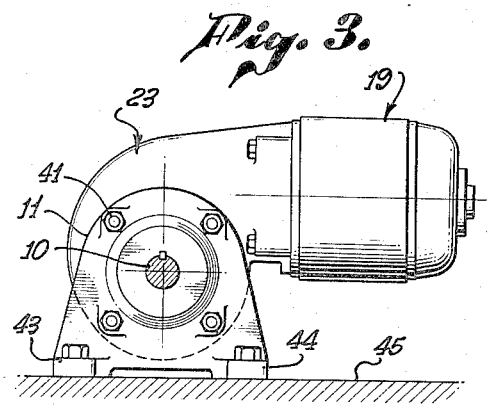
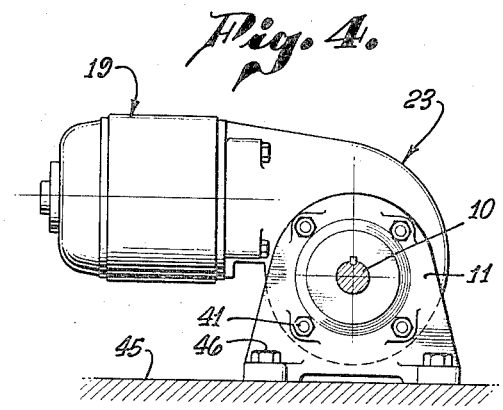
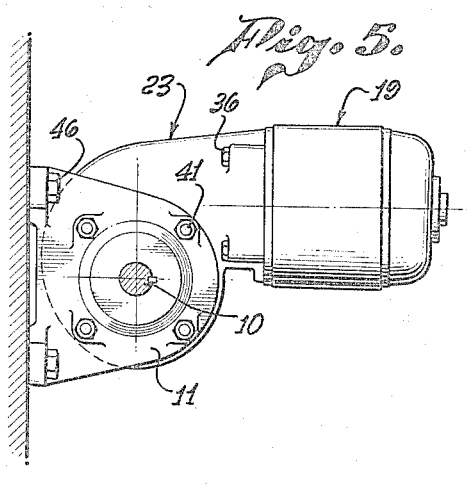
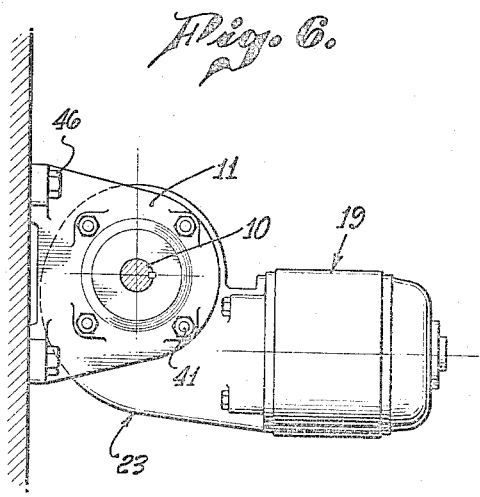
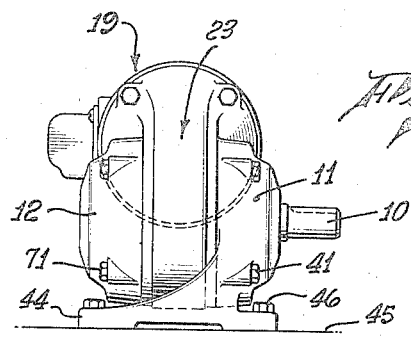
FREDERICK O. LUENBERGER
INVENTOR.
BY John Flam
ATTORNEY.

FREDERICK O. LUENBERGER,
INVENTOR.

BY John Flam
ATTORNEY.

United States Patent Office 2,734,393
Patented Feb. 14, 1956

2,734,393

MOUNTING FOR TRANSMISSION AND DRIVE

Frederick O. Luenberger, Los Angeles, Calif., assignor to U. S. Electrical Motors, Inc., Los Angeles, Calif., a corporation of California Application May 31, 1952, Serial No. 291,025

2 Claims. (Cl. 74—425)

This invention relates to a transmission mechanism, and particularly to a mounting for rotary driving and driven members incorporating respectively a cooperating worm and a worm wheel, the axes of which extend at right angles to each other.

It is an object of this invention to provide a novel arrangement for the mounting of rotary driving and driven members, the axes of which are at right angles to each other, whereby the relative positions of the members can be easily adjusted.

It is another object of this invention to provide a mounting for a structure of this character whereby a single construction may be adapted for any particular installation by an appropriate simple adjustment of parts, whereby the space requirements of the installation can be easily met.

It is another object of this invention to provide a support for a driven shaft member upon which a driving member can be adjustably supported, and in which the position of the driving member can be adjusted upon a permanently mounted bracket for the driven member without disturbing the mounting bracket for the driven member.

It is another object of this invention to provide a relatively adjustable support for worm and worm wheel mechanisms without danger of disturbing the alignment of bearing supports for either of the mechanisms.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a sectional view illustrating the two-part transmission mechanism in one operating position;

Fig. 2 is a sectional view taken along the plane indicated by line 2—2 of Fig. 1;

Figure 8:
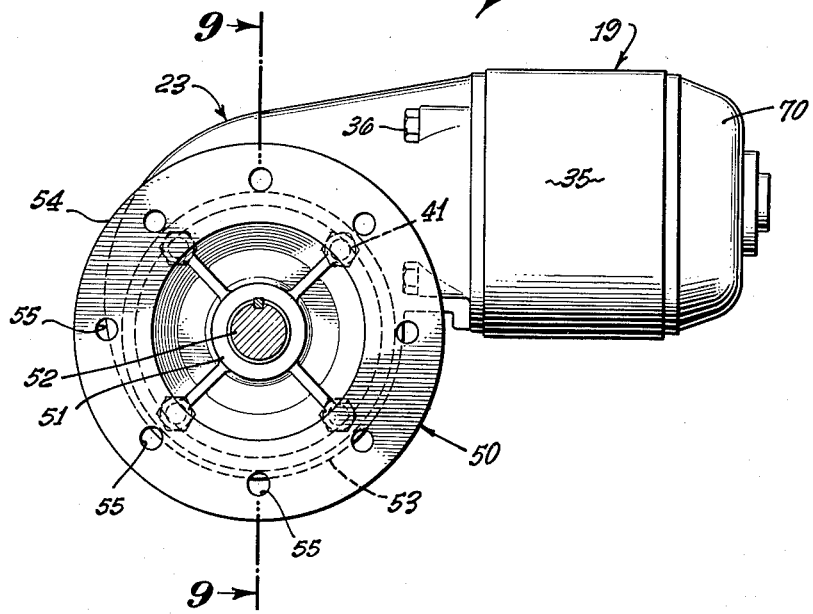

Figs. 3 through 7, inclusive, are elevations illustrating the construction mounted in a manner according to the needs of the particular installation;

Fig. 8 is an elevation illustrating a modified form of this invention; and

Figure 9:
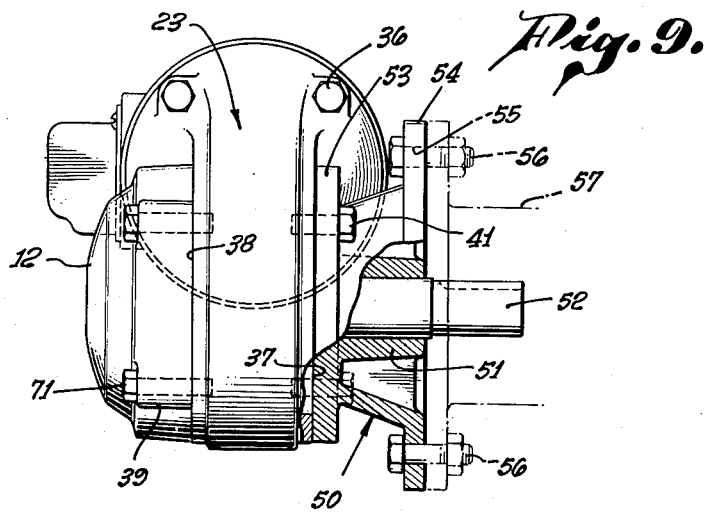

Fig. 9 is a side elevation of the apparatus illustrated in Fig. 8, with a portion thereof in section along the plane indicated by line 9—9 of Fig. 8.

Referring to Figs. 1 and 2, a driven shaft 10 is illustrated as rotatably supported by end brackets 11 and 12. These end brackets have bearing recesses 13 and 14 respectively, accommodating rolling bearing structures 15 and 16 in a conventional manner. The shaft 10 carries a worm gear 17 for driving the shaft 10. For this purpose the gear 17 is joined to the shaft by a key 18.

For driving the shaft 10, an electric motor structure 19 has a shaft 20 carrying a worm 21 in driving engagement with the gear 17 of the shaft 10. In this instance the worm is accommodated on a reduced portion of the shaft 20 and secured for rotation therewith by a key 22. The shafts 10 and 20 extend at right angles to each other.

A special type of housing is provided for the motor 19 and the shaft 20 and worm 21. One portion 23 of this housing has a cylindrical wall portion 24, illustrated most clearly in Fig. 2, as well as a wall 25 extending radially beyond wall 24 for the accommodation of the worm 21 and its shaft 20. Wall portion 24 forms an open-ended annular casing for circumscribing the driven shaft 10 and the gear 17. This annular housing member 23 for the driving members is interposed between the brackets 11 and 12 to form the intermediate part of the housing for the gear 17.

The housing member 23 provides bearing brackets 26 and 27 for rolling bearings 28 and 29, rotatably supporting the motor shaft 20.

Another portion 35 of the motor housing construction is a motor casing of customary form, enclosing the motor, and it may be secured to housing member 23 by suitable bolts 36. An end bearing bracket 70 completes the motor enclosure.

As illustrated most clearly in Fig. 2, the worm housing member 23 provides on opposite sides similiar annular surfaces 37 and 38, cooperating with annular surfaces of the driven shaft mounting brackets 11 and 12. A plurality of bolts 71 extends through suitable equiangularly spaced bosses 39 on the housing member 12 for securing the housing member 12 to the worm housing structure 23, by engaging threaded bosses 72 extending inwardly of housing 23.

The other housing member 11 for the driven shaft 10 and gear 17 has a series of equiangularly spaced bosses 40 for guiding a corresponding number of bolts 41 for securing the end bracket 11 to the worm housing member 23 at the annular edge 37. Appropriate threaded bosses 42, similarly equiangularly spaced, may cooperate with the bolts 41.

In the present instance four such bolts 41 are provided. Any one of the bolts 41 may cooperate with any one of the threaded bosses 42 of the housing member 23. Accordingly, the housing structure 23 can be positioned with respect to the driven shaft housing bracket 11 substantially in as many angular positions as there are bolts 41 and bosses 42. Furthermore, since the annular surfaces 37 and 38 are similar, the entire housing can be revised to provide either a right-hand or a left-hand mounting.

In the present instance mounting legs or pads 43 and 44 are illustrated as integrally formed on the end bracket 11 for supporting the entire structure on a wall or platform 45. These legs 43 and 44 extend for substantially the entire length of the assembled housing structure 11, 23, and 12 (see Figs. 2 and 7). For securing the legs 43 and 44 to a supporting platform or wall 45, a series of bolts 46 are provided, passing through the legs and in suitable engagement with the platform 45.

The bolts 41 are disposed at equal distances from the axis 47 of the driven shaft 10, no matter in which angular position the housing member 23 is secured to the bracket 11. Thus, the axis 48 of the motor driving shaft 20 will be spaced radially in a constant amount from the axis of the driven shaft 10, since the driving shaft axis 48 is rotated about the driven shaft axis 47. Accordingly, the worm 21 may cooperate with the gear 17 for any adjusted position of the housing 23.

Since the end bracket 12 is secured only to the worm and motor shaft housing 23, and not to the foot structure 43 and 44, it need not be detached from the housing 23 in order to secure such angular adjustment of the housing 23 with respect to the stationary housing 11.

By virtue of attaching the feet 43 and 44 only to one of the brackets 11, the alignment of the worm 21 and gear 17 is dependent only upon the connections of the housing 23 to the end bracket 11. If both brackets 11 and 12 were provided with foot-supporting structures, there would be a possibility of misaligning the gear 17 and worm 21 by virtue of an irregular surface 45. Such a problem is obviated by the present structure.

Referring to Figs. 3 through 7, inclusive, there are illustrated several different secured positions of the motor housing 23 and the bracket structures 11 and 12, such as may be required by the particular installation. The housing member 23 may be both angularly adjusted with respect to bracket 11 (compare Figs. 3 and 5) as well as reversed left for right (compare Figs. 3 and 4). Accordingly, numerous different adjustments are possible, such as required for floor, wall, or ceiling installations.

In Figs. 8 and 9 a modified form is illustrated. In place of the end bracket 11 illustrated in Figs. 1 and 2, a different form of end bracket 50 is illustrated. This end bracket 50 provides in this instance a sleeve bearing 51 for the driven shaft 52. The bracket 50 has annular flanges 53 and 54 at opposite ends, the flange 53 serving as the means for adjustably securing the motor and worm housing 23 in a manner substantially identical to that described in connection with Figs. 1 and 2. The other flange 54 has a series of apertures 55 accommodating bolts 56 for attachment of the bracket 50 to a supporting structure. This supporting structure 57, illustrated in dotted lines in Fig. 9, may be the equipment with which the shaft 52 cooperates.

The inventor claims:

1. In apparatus of the character described: an electric motor having a driving shaft, the shaft having an extension projecting beyond the motor; a housing member into which said driving shaft extension extends, said housing member forming a mounting end bracket for one end of the motor; said housing member having openings aligned on opposite sides thereof; the common axis of the openings extending in a direction at right angles to the axis of rotation of said driving shaft, and spaced laterally on one side of said driving shaft extension; the driving shaft extension bordering the openings; a worm carried by the driving shaft extension. a pair of brackets for supporting the housing member, and having parts cooperable respectively with said opposite openings; a driven shaft carried by the brackets and extending axially of said openings and in said housing member; and a worm wheel carried by said driven shaft engaging said worm.

2. In apparatus of the character described: an electric motor having a driving shaft, the shaft having an extension projecting beyond the motor; a housing member into which said driving shaft extension extends, said housing member forming a mounting end bracket for one end of the motor; said housing member having openings aligned on opposite sides thereof; the common axis of the openings extending in a direction at right angles to the axis of rotation of said driving shaft, and spaced laterally on one side of said driving shaft extension; the driving shaft extension bordering the openings; a worm carried by the driving shaft extension; a pair of brackets for supporting the housing member, and having parts cooperable respectively with said opposite openings; a driven shaft carried by the brackets and extending axially of said openings and in said housing member; and a worm wheel carried by said driven shaft engaging said worm; one of said brackets having feet extending in a direction parallel to the axis of said driven shaft beneath said housing member and the other bracket, the said one bracket being selectively angularly positioned about the axis of said driven shaft correspondingly selectively to orient said feet; the brackets being interchangeably cooperable with the housing member at opposite openings.

References Cited in the file of this patent

UNITED STATES PATENTS

| 945,988 | Simonds | Jan. 10, 1910 |
| 1,721,565 | Lee | July 23, 1929 |
| 2,518,833 | Stevens | Aug. 15, 1950 |

FOREIGN PATENTS

| 457,134 | Germany | Mar. 9, 1928 |
| 504,735 | Great Britain | May 1, 1939 |
| 619,237 | Great Britain | Mar. 7, 1949 |